United States Patent
Hazart

(10) Patent No.: US 7,158,239 B2
(45) Date of Patent: Jan. 2, 2007

(54) OPTICAL METHOD OF EXAMINING RELIEFS ON A STRUCTURE

(75) Inventor: Jerome Hazart, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 75 days.

(21) Appl. No.: 10/534,534

(22) PCT Filed: Dec. 22, 2003

(86) PCT No.: PCT/FR03/50198

§ 371 (c)(1), (2), (4) Date: May 12, 2005

(87) PCT Pub. No.: WO2004/059246

PCT Pub. Date: Jul. 15, 2004

(65) Prior Publication Data

US 2006/0103855 A1    May 18, 2006

(30) Foreign Application Priority Data

Dec. 23, 2002 (FR) .................................... 02 16526

(51) Int. Cl.
*G01B 11/24* (2006.01)

(52) U.S. Cl. .................... 356/601; 356/625; 356/237.5

(58) Field of Classification Search ................ 356/601, 356/625, 636, 237.5
See application file for complete search history.

(56) References Cited

U.S. PATENT DOCUMENTS

| 5,900,633 | A | 5/1999 | Solomon et al. | |
| 5,963,329 | A | 10/1999 | Conrad et al. | |
| 6,462,817 | B1 | 10/2002 | Strocchia-Rivera | |
| 6,483,580 | B1 | 11/2002 | Xu et al. | |
| 6,952,271 | B1 * | 10/2005 | Niu et al. | 356/625 |
| 7,030,999 | B1 * | 4/2006 | Bischoff et al. | 356/636 |
| 7,064,829 | B1 * | 6/2006 | Li et al. | 356/369 |
| 2002/0113966 | A1 | 8/2002 | Shchegrov et al. | |
| 2002/0188580 | A1 | 12/2002 | Doddi et al. | |
| 2004/0150838 | A1 * | 8/2004 | Niu et al. | 356/625 |
| 2005/0200859 | A1 * | 9/2005 | Hazart | 356/613 |
| 2005/0231737 | A1 * | 10/2005 | Chu | 356/636 |
| 2006/0119863 | A1 * | 6/2006 | Li et al. | 356/601 |

FOREIGN PATENT DOCUMENTS

WO    WO 02/27288    4/2002

* cited by examiner

Primary Examiner—Hoa Q. Pham
(74) Attorney, Agent, or Firm—Oblon, Spivak, McClelland, Maier & Neustadt, P.C.

(57) ABSTRACT

A method for studying a surface provided with relief features, wherein a measurement spectrum is taken and then compared with test spectra representative of arbitrary structures that are adjusted stepwise. A correlation over representative points of the spectra is selected while optimizing the determination by a hierarchized adjustment of the parameters.

7 Claims, 4 Drawing Sheets

OPTICAL METHOD OF EXAMINING RELIEFS ON A STRUCTURE

Figure 1:
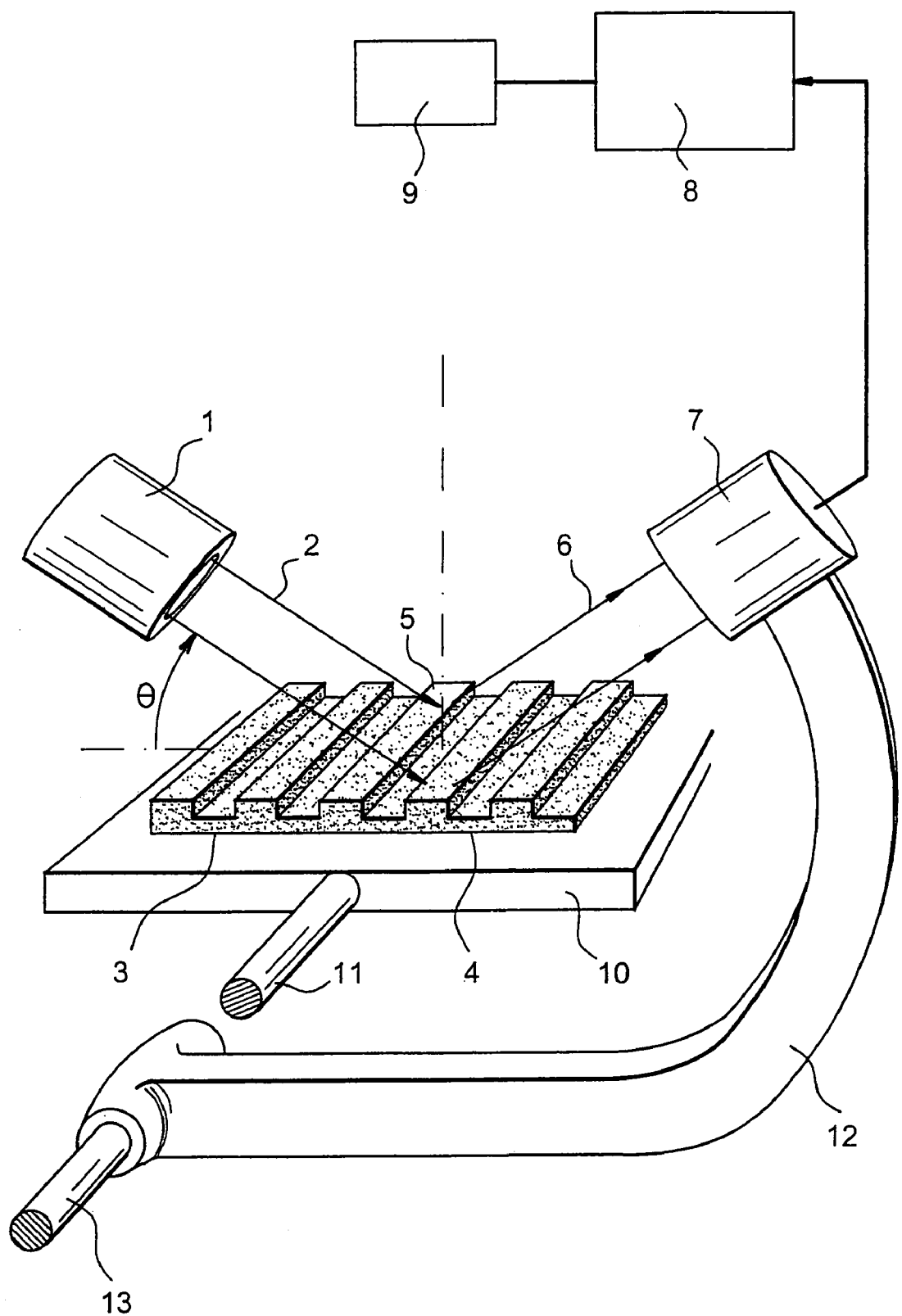

The present invention relates to a method for studying a structure via optical means for a dimensional inspection of its relief features. Such methods find application in the geometrical characterization of regularly spaced out patterns, but their microscopic dimensions make them little accessible to direct measurement methods, like the relief lines in microelectronics.

The term of scatterometry is often used in the art for designating methods where the surface to be studied receives radiation which it reflects back by giving a diffracted spectrum depending on the relief features. The measurement spectrum is collected and displayed on a graphical medium. It cannot be used for directly inferring the characteristics of the relief features, and this is why one proceeds with comparisons of the spectrum with reference spectra obtained for surfaces with known relief features: if the measurement spectrum is close to one of the reference spectra, its relief will look like the one which has given rise to this reference spectrum. The reference spectra may be extracted from a library or from tests of simulations of the diffraction of models with parameterized relief features of the surface. This second kind of method is iterative by varying the parameters in order to converge towards the solution. U.S. Pat. Nos. 5,739,909 and 5,867,276 are relative to methods for studying a surface by reflectometry. Other documents are known in the art.

Certain difficulties need to be faced in this kind of methods. It is obvious that a sufficiently well-provided library is required for giving an accurate estimation of the relief features. The iterative methods are subject to modelling inaccuracies and to difficulties in converging towards the correct solution. Excessive computation times result from this.

The invention provides an enhancement to the measurements of relief features of a surface by reflectometry, and more specifically to the second mentioned family of methods where simulations of the relief and the spectra are performed. With it, it is possible to obtain better correlations between the measured spectrum and the successive test spectra.

It may be defined in its more general form, by a method for studying a surface by reflectometry, comprising steps for projecting radiation onto the surface, for collecting a measurement spectrum of the radiation after reflection of radiation on the surface and displaying the spectrum on a graphical medium, further comprising steps for selecting points of the spectrum, the points being able to be joined by lines approaching the spectrum, and for seeking relief features of the surface by comparisons of selected points of the measurement spectrum with homologous points of a test spectrum, the test spectrum coming from a simulated reflection of the radiation on a test surface resulting from modelling of the relief expressed by parameters, and comprising adjustments of the comparisons and of the test spectrum by adjustments of the parameters, characterized in that the parameters are successively adjusted in an order determined by a sensitivity of the test spectrum to said parameters, the most influential parameter(s) on said spectrum being adjusted first and so forth. Preferably, the relieve is modelled by a stack of slices expressed by parameters including a number of slices in the stack and heights and widths of sections of slices, the number and the heights and widths being determined from a total error and from a propagation constant of the radiation. The error for each slice may be defined by the integral over a height of the slice, of the absolute value of the difference between the propagation constant of the relief and the average propagation constant of the slice. The sum of the errors of all the slices, according to a possible criterion, should be less than or equal to an acceptable value.

The invention will now be described more completely in relation to the figures.

Figure 2:
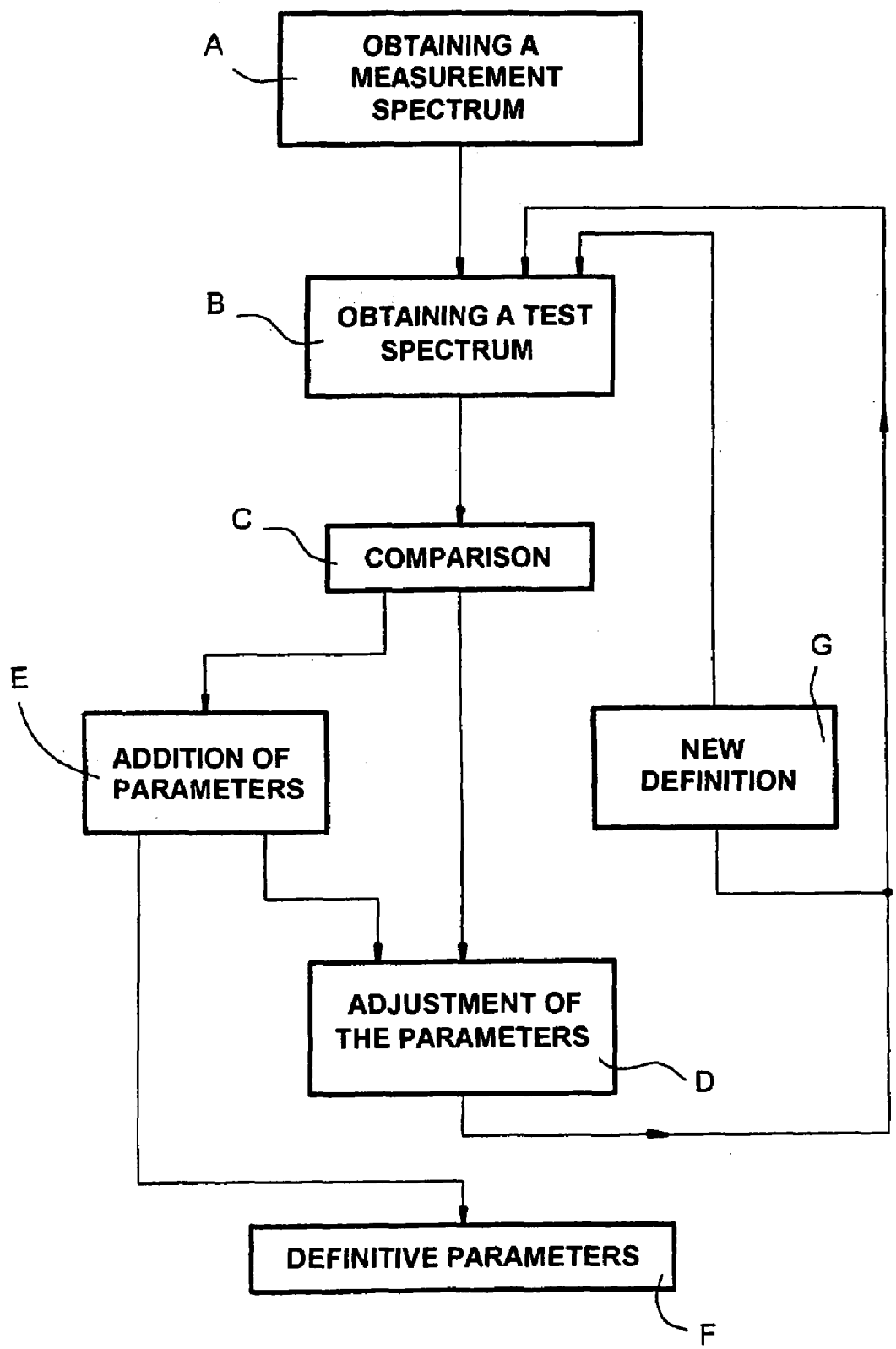
Figure 3:
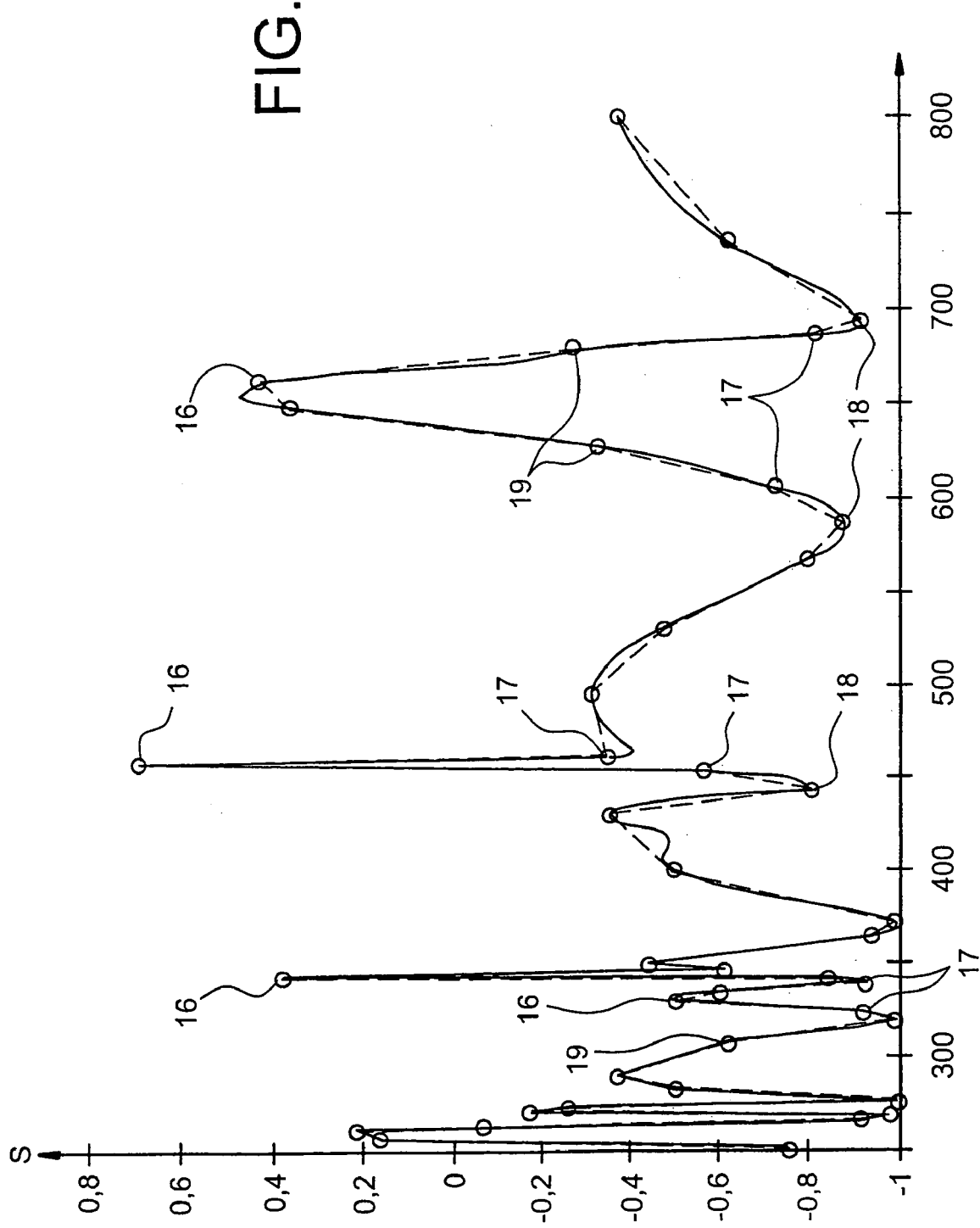

FIG. 1 illustrates a study device,

FIG. 2 a flow chart of the method,

FIG. 3 a measurement spectrum and

Figure 4:
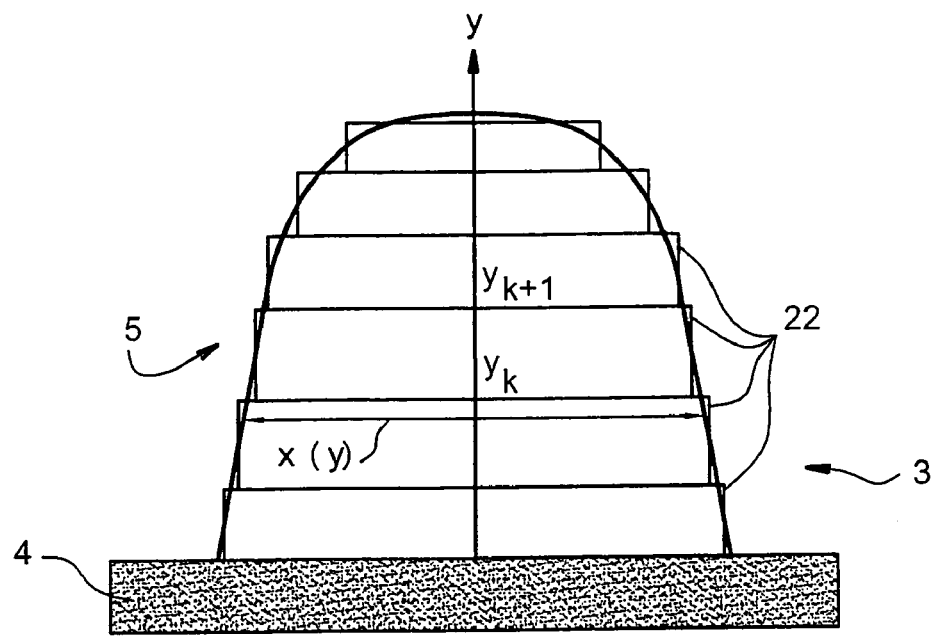
Figure 5:
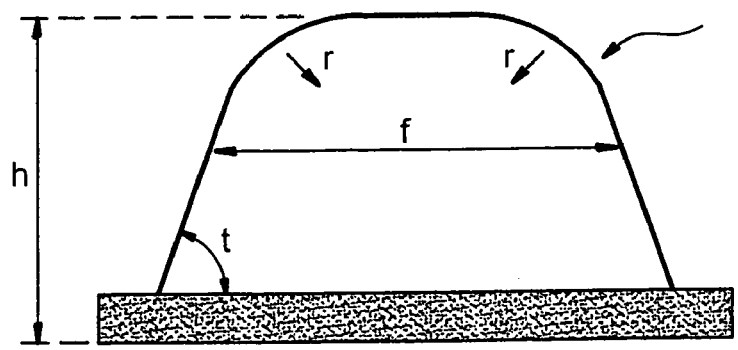

FIGS. 4 and 5 certain study techniques.

A light source 1 which may consist of a laser extended by an optical fiber, projects an incident light beam 2 towards a sample 3 consisting of a striated substrate 4 and protruding relief features thereof form linear edges 5 on the upper surface which is studied. The incident light beam 2 is reflected on the sample 3 into a reflected light beam 6, the direction of which is symmetrical relatively to the normal to the substrate 4 at the illumination point and leads to a spectrometer 7. Practically, several tens of edges 5 are reached at the same time by the light beam and contribute to the measurement at the same time. The setup further schematically comprises a control system 8, one of the functions of which is to collect measurements by the spectrometer 7, and also to retransmit them to a graphic interface 9 which is consulted by the user. Some other possibilities of the setup are only outlined. It is thus possible to incline the sample 3 by rotating a plate 10 onto which the substrate 4 is adhered, by controlling a rotation of a support axis 11 of the plate 10. A rotation of the spectrometer 7 by a double angle in order to continue to receive the measurement, is then also controlled, by moving a bent arm 12 on which it is mounted around a coaxial or preceding axis 13. These movements are provided by the control system 8. The operator also has a keyboard or equivalent components for acting on the setup via the control system 8. The incidence angle of the light beam 2 incident on sample 3 is designated by $\theta$, the wavelength of the light by $\lambda$ and the polarization angle of the latter by p. Measurements by reflectometry may assume various aspects according to the parameter which is varied in order to have not only a single measurement point but also a complete spectrum. A so-called spectroscopic measurement will now be more fully described here, wherein the spectrum is obtained by varying the wavelength $\lambda$ in a sufficiently large range, but so-called goniometric measurements where the incidence angle $\theta$ varies, are also very common for obtaining another spectrum. The application of the invention is not affected by the category of the spectrum.

Now, reference is made to FIG. 2 for the general description of the method used. Step A consists of obtaining a measurement spectrum in the way which has just been indicated. The following step B consists of obtaining a test spectrum which is compared to the previous one in the next step C. A parameter of the sample 3 will then be adjusted in the next step D with the expectation of improving the comparison, and one will go back to step B and the following steps until an optimum comparison is reached. Step C will then be followed by a step E for adding the parameters which will be adjusted, and a series of cycles of steps D, B and C will be started again until the new parameters themselves are optimized too. Likewise, one will proceed until all the parameters have been considered, after which a solution of the system will be reached and the values of the parameters will be provided to the user according to step F. After an adjustment (D), it will then be also possible from time to time, to order a new definition of the model in step G before coming back to step B.

We are now concerned with step A of the method. This is an essential aspect as it allows an enormous reduction of the computation times required for the correlation by successive iterations. The spectrum illustrated here is light intensity versus the wavelength λ. Only a few points of this spectrum notably those, noted as 16, which are located on the tops of the peaks of the spectrum, other points noted as 17 located at the base of these peaks, if need be, points 18 located in the valleys of the spectrum if they are pronounced, will be considered; points intermediate to the previous ones, noted as 19, may also be selected. Obtaining a very good fit is sought between the actual measured spectrum and a fictitious spectrum defined by lines joining the successive selected points. The illustration of FIG. 3 shows that this can be reached with a reduced number of points; verifications may be undertaken by calculating the general deviation between the measured spectrum and the spectrum defined by the selected points. Another possibility, to which it is easy to resort although this is not done with the example of FIG. 3, is to only consider a portion of the spectrum, estimated to be of interest and to completely ignore the remainder in the correlations. However points belonging to different regions, such as the tops and bases of the peaks, should be retained in order to provide a reliable basis of comparison.

In other embodiments of the invention, different but satisfactory approximations of the spectrum are reached by regularly sampling the spectrum over the range of wavelengths or in energy.

We now pass to a description on how to obtain the test spectra and their adjustment.

According to FIG. 4, the edges 5 may be assimilated to a stack of superimposed slices 22 with various widths crossed by the light according to a determined propagation mode depending on the angle of incidence. This decomposition into slices 22 is used as a model for obtaining test spectra by simulation. In the most common method, the slices 22 are assumed to be of uniform width, therefore of rectangular section and their thickness is selected arbitrarily. Each of the slices 22 then has a uniform propagation constant of light noted as $\beta_k$, where k in the index of the relevant slice 22. This propagation expresses the propagation velocity of the light through the slice 22 according to the prevailing propagation mode. However a systematic error is committed as the relief in reality has a variable width in the slices 22. This error may be expressed by the formulae:

$$e_k = \int_{y_k}^{y_{k+1}} |\bar{\beta}_k - \beta(y)| dy$$

$$\bar{\beta}_k = \frac{1}{y_{k+1} - y_k} \int_{y_k}^{y_{k+1}} \beta(y) dy$$

wherein $y_k$ and $y_{k+1}$ are the extreme heights of the slice 22, and $\beta(y)$ the real light propagation constant at any height y, calculated from the local width x(y) of the relief between the sides of the edge 5, and barred $\beta_k$ is the average real constant in the slice 22. The error is therefore computed over the integral of the height of each slice.

The article "Formulation for stable and efficient implementation of the rigorous coupled-wave analysis of binary gratings" published in the Journal of Optical Society of America, Vol. 12, No. 5, May 1995, pages 1068–1076, by Moharam et al., gives details on the propagation of light in the edges 5 or other relief features.

According to the invention, the thicknesses $(y_{k+1}-y_k)$ of the slices 22 are no longer selected arbitrarily, but in such a way that the total obtained error of the test spectra over all the modelled relief, $E=\Sigma e_k$, becomes less than or equal to an acceptable maximum $E_{max}$. Step G of the method will therefore consist of adjusting the height of the slices 22 composing the edge 5 and applying the previous formulae so that $E=E_{max}$. The edge 5 will then be cut out in the best way, by reconciling a reduced error and a moderate number of slices 22, which will have the advantage of not increasing the computation times excessively.

We explain this adjustment and move onto other steps of the correlation method by means of FIG. 5. Edge 5 may be assimilated to a relief feature with a simple shape, such as a trapezium with rounded upper corners, in many practical cases. This shape may be described by means of four parameters, i.e., the height h, the angle of the sides t, the curvature r of the upper corners and the width f, for example at half-height. Other shapes are conceivable.

These parameters govern the decomposition of the edge 5 by which the test spectra are obtained, as well as the part of the method explained by FIG. 4. Their values are unknown at the beginning, as they are the subject of the study, and they should therefore be inferred by correlations between the measurement spectrum and the test spectra by iteratively varying them for improving correlation. One test spectrum is calculated per group of values taken by the parameters in the method's progression. A first step, which may be accomplished for each set of parameters or only for some of them, is step G, which gives the optimum number of slices 22 for the current values, or not very different earlier values of the parameters and according to the previous criteria. According to another aspect of the invention, classes of the parameters are determined. Indeed, an anarchic adjustment of the latter may fail to provide the exact solution of the problem by only converging towards a local solution. This is why it is decided to vary the parameters one after the other to achieve the adjustment, by starting with the most significant ones, i.e., those which have the most influence on the test spectrum.

Each of the classes of parameters may comprise one or more parameters. Adjustment is first made by only using the parameters of the first class. It may be estimated here that the height and the width will have comparable importance, so that the first class will comprise both of them. A cycle of A, B, C and D steps is then undertaken by adjusting the values of f and h until a minimum of the difference between the measurement spectrum and the last test spectrum is obtained. A new cycle of B, C and D steps is then undertaken by also considering the second class of parameters, which comprises the angle t: this time, parameters h, f and t, are varied at the same time. Finally, a last cycle of steps B, C and D is undertaken by incorporating the third class of parameters, comprising the curvature r, and therefore by varying all the parameters at the same time. When the minimum error between the measurement spectrum and the test spectrum has been found, it is considered that edge 5 has been found.

It is clear that the invention may be applied to other shapes of edges.

The invention claimed is:

1. A method for studying a surface by reflectometry, comprising:
   projecting a radiation on the surface;
   collecting a measurement spectrum of the radiation after reflection of the radiation on the surface and displaying the spectrum on a graphic medium;
   selecting points of the spectrum, the points configured to be joined by lines approaching the spectrum; and seeking relief features of the surface by comparisons of selected points of the measurement spectrum with homologous points of a test spectrum, the test spectrum coming from a simulated reflection of the radiation on a test surface resulting from modeling the relief as expressed by parameters, and comprising adjustments of the comparisons and of the test spectrum by adjustments of the parameters, wherein the parameters are successively adjusted in an order determined by a sensitivity of the test spectrum to the parameters, most influential of the parameters on the spectrum being adjusted first and so forth.

2. The method according to claim 1, wherein the relief is modeled by a stack of slices defined by a number of slices in the stack and heights and widths of sections of slices, the number as well as the heights and widths being determined from a total error and from a propagation constant of the radiation.

3. The method according to claim 2, wherein the error for each slice is defined by the integral over a height of the slice, of the absolute value of the difference between the propagation constant of the relief and the average propagation constant of the slice.

4. The method according to claim 3, wherein a sum of the errors of all the slices is equal to a maximum acceptable value.

5. The method according to claim 1, wherein the most influential parameters comprise a height and width of the relief features, which are changed in the adjustments first.

6. The method according to claim 5, wherein the parameters comprise a slope and a rounding of the relief features, which are changed in this order in the adjustments, and after the height and the width.

7. The method according to claim 6, further comprising adjustments of the number of levels of the relief features used for obtaining the test spectrum.

* * * * *